Figure 1:
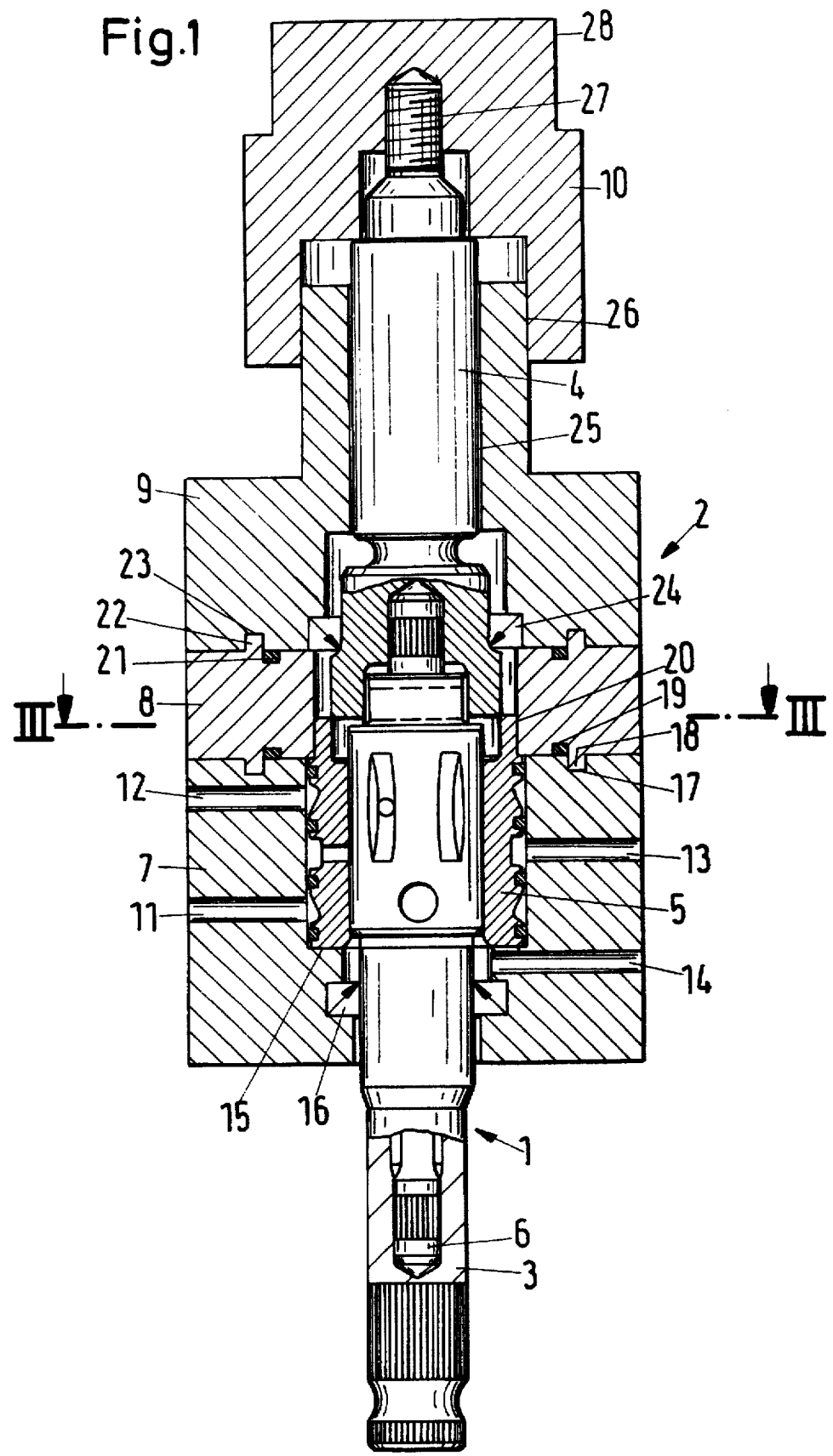

United States Patent

Pfeifer

Patent Number: 5,799,380
Date of Patent: Sep. 1, 1998

[54] DEVICE FOR ASSEMBLING A SERVO VALVE

[75] Inventor: Arnd Pfeifer, Willich, Germany

[73] Assignee: TRW Fahrwerksysteme GmbH & Co.KG, Dusseldorf, Germany

[21] Appl. No.: 496,766

[22] Filed: Jun. 29, 1995

[51] Int. Cl.⁶ ................................................ B23P 19/04
[52] U.S. Cl. ........................... 29/252; 29/890.124; 29/271
[58] Field of Search ........................... 29/525, 890.124, 29/252, 269, 244, 271, 281.1

[56] References Cited

U.S. PATENT DOCUMENTS

| | | | |
|---|---|---|---|
| 3,495,623 | 2/1970 | Jespersen | 29/890.124 |
| 4,641,812 | 2/1987 | Vanderlaan et al. | 29/890.124 |
| 4,953,276 | 9/1990 | Kusmer et al. | 29/252 |
| 5,289,634 | 3/1994 | Makino et al. | 29/890.124 |
| 5,531,013 | 7/1996 | Nakamura | 29/890.124 |
| 5,577,322 | 11/1996 | Ohshita et al. | 29/890.124 |

FOREIGN PATENT DOCUMENTS 3930541   3/1990   Germany .

*Primary Examiner*—Larry I. Schwartz
*Assistant Examiner*—Marc W. Butler

*Attorney, Agent, or Firm*—Tarolli, Sundheim, Covell, Tummino & Szabo

[57] ABSTRACT

The invention proposes a rapid, safe, and economic device for assembling a servo valve with an input shaft, an output shaft and a valve sleeve in a hydraulically centered position by:

a) Forming a preassembled unit consisting of the output shaft and the input shaft;

b) Clamping the valve sleeve into a rotatable position, however a position in which it is fixed in the axial direction;

c) Inserting the preassembled unit into the valve sleeve, with said preassembled unit being axially movable, but positioned in a nonrotatable fashion such that the valve sleeve and the output shaft adjoin one another and can be turned relative to one another;

d) Charging the preassembled servo valve with hydraulic pressure;

e) Centering the servo valve by turning the valve sleeve; and f) Pressing the preassembled unit into the valve sleeve such that the output shaft and the valve sleeve are pressed together within the overlapping region.

15 Claims, 3 Drawing Sheets

DEVICE FOR ASSEMBLING A SERVO VALVE

The invention pertains to a method for assembling a servo valve consisting of an input shaft, an output shaft, and a valve sleeve that surrounds the input shaft in a hydraulically centered position. The invention additionally pertains to a device for carrying out said method.

Servo valves of the aforementioned type are primarily used in power-assisted steering systems. In such servo valves, an input shaft that is connected with a steering rod hydraulically cooperates with a valve sleeve that surrounds said input shaft, with the valve sleeve being connected with an output shaft that is provided with a pinion. The pinion acts on the steering rack of the steering mechanism. Hydraulic fluid is pumped through the system under pressure by means of a pump. When turning the input shaft relative to the valve sleeve, hydraulic pressure is fed to a hydraulic motor that boosts the movement of the steering rack in one of the two possible directions.

Customary servo steering valves can comprise a torque rod in order to connect the input shaft with the output shaft. These torque rods are realized in the form of rod-shaped spring elements, with one end of the torque rod being fastened to the input shaft and the other end being fastened to the output shaft. However, it is no longer absolutely imperative that more modern servo valves comprise a torque rod as long as they are provided with a reaction device between the input shaft and the valve sleeve which exerts a radial force.

In any case, it is of particular importance that the individual components of the servo valve are not only mechanically connected with one another, but that the valve sleeve and the input shaft are assembled in a hydraulically centered position relative to one another. If this were not the case, the input shaft and the valve sleeve would be situated in a position in which they are turned relative to one another, i.e., a position that corresponds with a continuous angular displacement in one steering direction.

Originally, the servo valve was assembled in a complete fashion. In this case, it was still possible to turn the input shaft relative to the torque rod. Subsequently, the input shaft was turned until a hydraulically centered position was reached. Finally, a drilled hole that extends through the input shaft and the torque rod was produced, with a bolt for realizing a rigid rotary connection between the input shaft and the torque rod subsequently being inserted into said drilled hole. However, this resulted in certain sealing problems because the hollow input shaft through which the hydraulic medium flows needed to be sealed separately at its free end. In addition, this also resulted in certain problems with respect to the drilling of the drilled hole, namely when fixing the components that can be turned relative to one another.

Subsequently, a rigid rotary connection between the input shaft and the torque rod was realized by means of an axial knurl and the input shaft, the output shaft and the torque rod were preassembled in a complete fashion. In addition, the valve sleeve was placed on the output shaft and provided with a threaded hole into which an eccentric screw is inserted. In this case, the valve sleeve can be turned relative to the output shaft until the servo valve reaches a hydraulically centered adjustment by turning the eccentric screw. Subsequently, the eccentric screw is fixed in its position, namely by caulking the thread and, if necessary, additionally utilizing a hardening adhesive agent. However, this method has a number of disadvantages. One difficulty is the securing of the thread because the eccentric screw should be able to be turned in order to carry out an adjustment, but an additional turning of said eccentric screw should be largely precluded by caulking the thread. This method also requires one additional production step for producing the threaded hole. In addition, this method requires an eccentric screw, the manufacture of which is associated with high expenditures. The utilization of an eccentric screw only allows a very small range of adjustment. In addition, the eccentric screw also needs to be accessible for carrying out the adjustment while the servo valve is under hydraulic pressure. This results in numerous complications with respect to procedural considerations and the arrangement of the components. Consequently, the final assembly into the hydraulically centered position is very time-consuming and demanding for the personnel.

Originating from this state of the art, the invention is based on the objective of disclosing a method for assembling a servo valve in a hydraulically centered position which can be carried out in a rapid, simple, and safe fashion and makes it possible to reduce the expenditures as compared to customary methods of this type. In addition, the invention discloses a device for carrying out the aforementioned method.

In order to attain this objective, the invention proposes a method for assembling a servo valve with an output shaft, an input shaft, and a valve sleeve in a hydraulically centered position which is characterized by the following steps:

a) Forming a preassembled unit consisting of the output shaft and the input shaft;

b) Clamping the valve sleeve into a rotatable position, however a position in which it is fixed in the axial direction;

c) Inserting the preassembled unit into the valve sleeve, with said preassembled unit being axially movable, but positioned in a nonrotatable fashion such that the valve sleeve and the output shaft adjoin one another and can be turned relative to one another;

d) Charging the preassembled servo valve with hydraulic pressure;

e) Centering the servo valve by turning the valve sleeve; and f) Pressing the preassembled unit into the valve sleeve such that the output shaft and the valve sleeve are pressed together within the overlapping region.

According to this method, the final process in which the output shaft and the valve sleeve are pressed together eliminates the need for an additional adjusting element, e.g., a very small but highly rigid screw as is required with the state of the art. The valve is hydraulically centered by turning the components in the axial direction, namely in a condition in which the valve is not yet completely assembled. Subsequently, the valve is assembled in the respectively turned position by means of a final assembly in the axial direction, namely pressing. This method does not require that the range of adjustment under hydraulic pressure needs to be accessible because the turning of the exterior sleeve can also be carried out with corresponding contrivances. In addition, weakening holes or threads in the valve sleeve or the pinion are no longer required. The assembly in a hydraulically centered position can be carried out in a much more rapid fashion than with customary methods because only one production step, namely the final assembly by axially assembling the components, is required after reaching the centered position.

The invention advantageously proposes that the valve sleeve is clamped into an exactly controllable turning device. This measure makes it possible for the assembly to also be carried out by personnel that is trained less comprehensively. In addition, the adjustment is improved. The invention advantageously proposes that the preassembled valve is charged with hydraulic pressure in a hydraulically sealed enclosure. The invention advantageously proposes that the hydraulically sealed enclosure be formed by the clamping devices during the preassembly of the valve. These measures increase the safety of the assembly and prevent a faulty adjustment, e.g., due to leakage.

The invention advantageously proposes that the preassembled unit is pressed into the valve sleeve by the force of a press. This measure makes it possible to utilize customary presses such that advantageous effects with respect to the efficiency of the method and the operating safety are attained.

The method according to the invention additionally proposes that the output shaft and the input shaft are connected with a torque rod when forming the preassembled unit.

In addition to the utilization of customary manufacturing devices, e.g., customary presses, the method according to the invention also makes it possible to assemble a new valve in which the valve components are assembled in an exactly hydraulically centered position without additional elements. In order to simplify the pressing of the output shaft into the valve sleeve, the opposing surfaces can be provided with a bevel on the respective edge, i.e., the outer edge of the surface of the output shaft and/or the inner edge of the face surface of the valve sleeve can be provided with a bevel such that the process of pressing said components together is simplified. In addition, the output shaft and/or the valve sleeve can be provided with an axial knurl within the overlapping region to prevent said components from turning with respect to one another. The new valve does not require any additional production steps, e.g., the arrangement of drilled holes, the tapping of threads, caulking, and the like.

Regarding the objective of disclosing a device for carrying out the aforementioned method, the invention proposes a device that comprises a holding bushing for inserting the valve sleeve, an adjusting ring that is placed on the holding bushing and serves to guide the valve sleeve, a cover bushing that is placed on the adjusting ring and serves to guide the output shaft, and a plunger that is placed on the cover bushing and serves to accommodate the output shaft in a nonrotatable fashion.

The device according to the invention makes it possible to carry out the method according to the invention with a small number of simple components. The valve sleeve is inserted into the holding bushing. This bushing limits the movement of the valve sleeve in one axial direction and additionally comprises a drilled hole in which the input shaft is subsequently inserted. The holding bushing is additionally provided with hydraulic holes or connections for hydraulic lines such that the preassembled valve can be charged directly with hydraulic pressure via the holding bushing. The holding bushing is advantageously provided with a radial shaft seal. The axial dimensions of the holding bushing are chosen such that the end of the valve sleeve that must be connected to the output shaft protrudes freely from the holding bushing. The adjusting ring that engages with the freely protruding end of the valve sleeve in a nonrotatable fashion is placed on the holding bushing. According to one proposal of the invention, the adjusting ring can be provided with a clamping screw for this purpose. In addition, the adjusting ring can comprise cams that extend in the axial direction and engage in corresponding recesses or grooves in the valve sleeve. The adjusting ring is arranged such that it can be turned with respect to the holding bushing. In order to be able to carry out this rotation in an exact fashion, the adjusting ring is provided with an annular sleeve that, according to one proposal of the invention, can be turned relative to a thrust bearing by means of a spindle. The spindle head advantageously comprises a ball joint such that no undesired tension occurs while the adjusting ring and consequently the valve sleeve are being turned. The adjusting ring advantageously comprises an O-ring seal that hydraulically seals said adjusting ring against the holding bushing.

According to the proposed method, a preassembled unit is formed of the input shaft and the output shaft by assembling said components. Subsequently, the cover bushing, which axially guides the output shaft, is pushed over said output shaft. Finally, the plunger is placed on the end of the output shaft, with said plunger being connected with the output shaft in a nonrotatable fashion. The end of the output shaft, which is threaded, is particularly suitable for this purpose. In addition, the plunger placed on the cover bushing such that it overlaps said cover bushing is arranged in a nonrotatable fashion relative to the cover bushing. The plunger with the preassembled unit can consequently be moved axially relative to the cover bushing, but cannot be turned. This unit, which consists of the input shaft, the output shaft, the cover bushing and the plunger, is subsequently connected with the unit that consists of the holding bushing, the valve sleeve, and the adjusting ring. During this process, the cover bushing is placed on the adjusting ring, with the input shaft simultaneously being inserted such that it passes through the valve sleeve and consequently the adjusting ring and the holding bushing. The adjusting ring can be turned relative to the cover bushing. Consequently, the adjusting ring and the valve sleeve are arranged between the holding bushing and the cover bushing in a rotatable fashion. The face sides of the adjusting ring can be advantageously provided with annular cams that engage with corresponding annular grooves in the surfaces of the holding bushing and/or the cover bushing. In addition, an O-ring that seals the cover bushing can be arranged between the adjusting ring and the cover bushing. The cover bushing can, according to one proposal of the invention, be provided with a radial shaft seal for hydraulically sealing the inner region.

The holding bushing, the adjusting ring, and the cover bushing are connected with one another in the axial direction such that said components can no longer be moved axially. Since the plunger can be moved axially with respect to the cover bushing, the unit consisting of the output shaft and the input shaft can also be moved axially together with said plunger, i.e., the output shaft can also be moved axially with respect to the valve sleeve. In order to axially fasten the holding bushing, the adjusting ring and the cover bushing, it is possible to insert bolts that pass through said components in the axial direction, with the adjusting ring being provided with corresponding oblong holes in order to allow the turning of said adjusting ring.

In order to fix the plunger relative to the cover bushing in the rotating direction, it is, for example, possible to insert a feather key between the two aforementioned components.

The assembled device can now be charged with hydraulic pressure such that the servo valve can be hydraulically centered by turning the adjusting ring and consequently the valve sleeve. As soon as the hydraulic center is adjusted, a force is exerted upon the plunger such that said plunger is axially moved toward the cover bushing together with the unit consisting of the input shaft and the output shaft. The output shaft is pressed into the valve sleeve during this process. Due to this type of construction, both elements are pressed together such that the servo valve is hydraulically centered and its assembly is completed. After shutting off the hydraulic pressure, the device can be disassembled and the finished servo valve can be removed.

The device according to the invention allows a rapid, safe and exact hydraulic centering of the servo valve simply and at low cost. The device can be used in customary presses that generate the required axial forces and insure a sufficient axial clamping while charging the valve with hydraulic pressure. The special design of the adjusting ring makes it possible to carry out an adjustment in which the regions that are charged with the hydraulic pressure do not have to be accessible. These measures increase the operating safety that is additionally promoted due to the fact that leakages are prevented.

Figure 2:
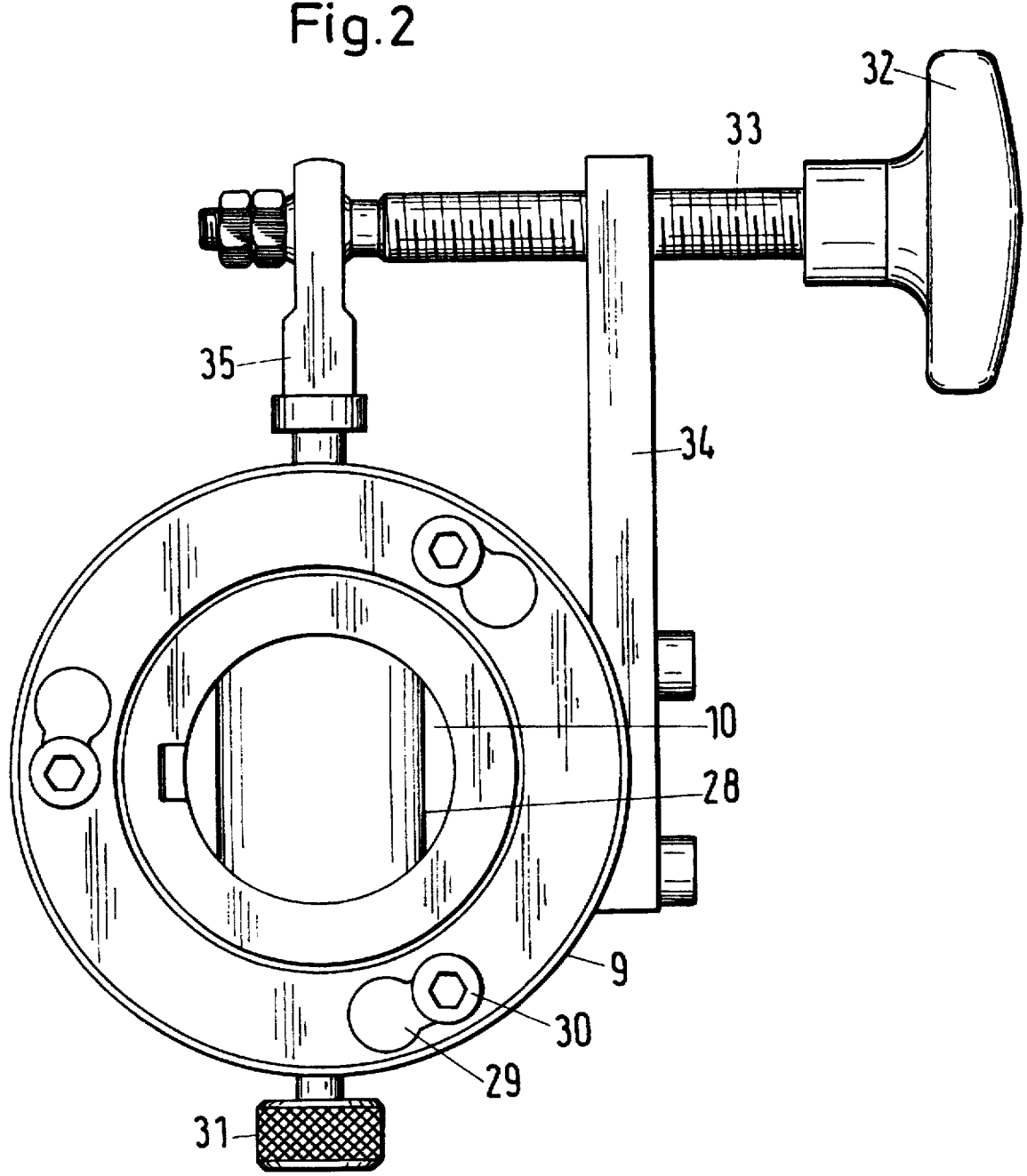

Additional advantages and characteristics of the invention are disclosed in the following description of the figures. The figures show:

FIG. 1: a sectional representation through one embodiment of an assembling device with an inserted and partially sectioned servo valve;

FIG. 2: a top view of the device shown in FIG. 1; and

Figure 3:
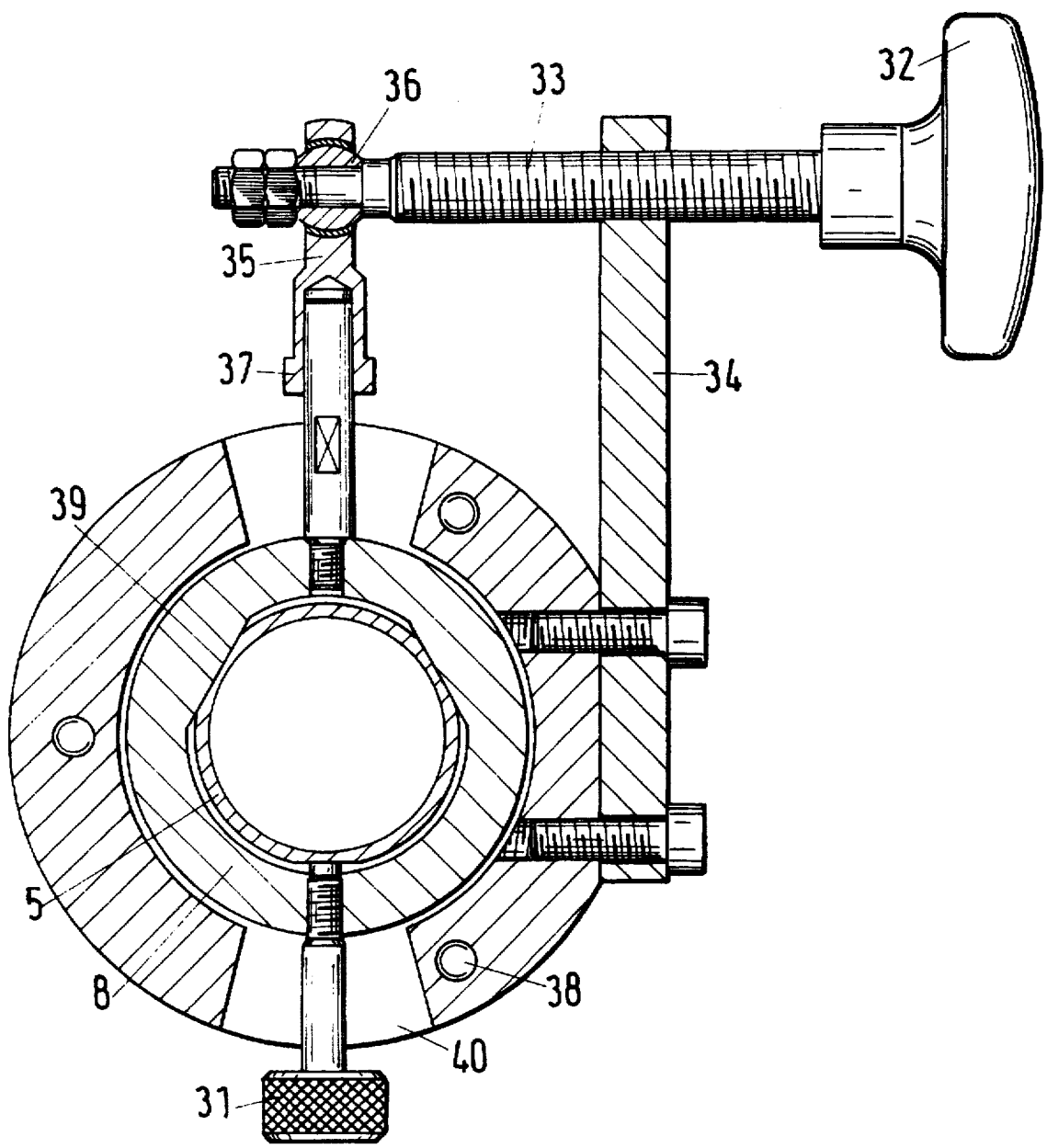

FIG. 3: a partial section along line III—III in FIG. 1.

One embodiment of a device for assembling a servo valve in a hydraulically centered position as well as the assembly method is described below with reference to FIGS. 1–3.

According to FIG. 1, the servo valve 1 is inserted into the assembling device 2 in a preassembled condition. The servo valve 1 in the embodiment shown comprises an input shaft 3, an output shaft 4, a valve sleeve 5, and a torque rod 6. The input shaft 3 and the output shaft 4 are connected with one another. The torque rod 6 is arranged between the input shaft and the output shaft and fastened to the two shafts with one respective end. In the embodiment shown, the torque rod is provided with an axial knurl at its end regions. The valve sleeve 5 and the output shaft 4 are not yet connected with one another in the illustration shown in to FIG. 1. These two components adjoin one another, but can be turned relative to one another.

The assembling device 2 comprises a holding bushing 7, an adjusting ring 8, a cover bushing 9, and a plunger 10. The holding bushing 7 comprises hydraulic holes 11 through 14. Hydraulic hole 13 represents the feed connection and hydraulic hole 14 represents the tank return line. The hydraulic holes 11 and 12 serve to control the left or right side of a not shown actuator and can be used for measuring the hydraulic pressure. The holding bushing 7 provides the valve sleeve 5 with an axial limit stop 15 within its lower region and additionally comprises a radial shaft seal 16 that serves to seal the interior of the bushing against the outside. In the embodiment shown, the holding bushing 7 is provided with an annular groove 17 into which a ring 18 that is formed on the adjusting ring 8 is inserted. The valve sleeve 5 is rigidly positioned in the holding bushing 7 in the axial direction, but can be turned. After inserting the valve sleeve 5 into the holding bushing 7, the adjusting ring 8 is placed on the holding bushing. The adjusting ring 8 limits the axial movement of the valve sleeve 5 in the direction away from the holding bushing 7. In addition, the adjusting ring 8 encompasses the region of the valve sleeve 5 that protrudes from the holding bushing 7, with said adjusting ring being connected with the valve sleeve 5 within this clamping region 20 in a nonrotatable fashion. An O-ring seal 19 that is arranged in a groove of the adjusting ring 8 is situated between the holding bushing 7 and the adjusting ring 8. It goes without saying that the groove can also be arranged in the holding bushing. A corresponding O-ring seal 21 and a corresponding ring 22 are also provided on the other side of the adjusting ring.

The preassembled unit consisting of the input shaft 3, the output shaft 4, and the torque rod 6 is inserted into the cover bushing 9. The end of the output shaft 4 is fastened in the plunger 10 within the fastening region 27, with said plunger overlapping the cover bushing within the overlapping region 26. It is, for example, possible to arrange a feather key within the overlapping region 26 such that a relative rotation between the cover bushing 9 and the plunger 10 [text cut off in the original].

However, the plunger 10 can be moved axially with respect to the cover bushing 9. The output shaft 4 that is guided within the guide region 25 of the cover bushing 9 can also be moved axially with the plunger 10. The cover bushing 9 is provided with a radial shaft seal 24 in order to seal the bushing region against the hydraulic pressure that is present on the outside. The preassembled unit with the attached cover bushing and the attached plunger is finally inserted into the unit consisting of the valve sleeve 5, the holding bushing 7, and the adjusting ring 8. During this process, one reaches the position shown in FIG. 1. The valve sleeve 5 is inserted between the holding bushing and the adjusting ring in a rotatable, however axially fixed fashion. The unit consisting of the input shaft 3, the output shaft 4, and the torque rod 6 can be moved axially in the cover bushing 9 together with the plunger 10, but is arranged in a nonrotatable fashion due to the design of the overlapping region 26 between the cover bushing 9 and the plunger 10. Consequently, the valve sleeve and the adjusting ring 8 can be turned collectively relative to the input shaft, but the input shaft 3 as well as the output shaft 4 and the torque rod 6 can only be moved axially. After charging this unit with hydraulic pressure, the hydraulic centering between the valve sleeve and the input shaft can be carried out by adjusting the adjusting ring. As soon as the components are hydraulically centered, an axial pressure is exerted on the plunger 10 that has the width 28 of a wrench within the upper region such that the plunger (10) is moved axially together with the output shaft 4, the input shaft 3 that is fastened to the aforementioned output shaft, and the torque rod 6 situated between both shafts. The output shaft 4 is subsequently pressed into the valve sleeve 5 within the clamping region 20. These two components can be provided with a bevel within the region of their surfaces such that the process of pressing said components together is simplified. In addition, both components can be designed such that they are unable to rotate relative to one another, e.g., by providing axial knurls or the like. The connection between the output shaft 4 and the valve sleeve 5 is realized by pressing said components together within the clamping region 20. These components can no longer be turned relative to one another after producing this connection. After shutting off the hydraulic pressure, the device is disassembled and the centered servo valve is removed.

The connection between the cover bushing 9 and the holding bushing 7 is realized by bolts that are shown in FIG. 2. The bolts 30 are screwed into the holding bushing 7 and extend through oblong holes arranged in the adjusting ring. The adjusting ring can also be provided with an annular sleeve or be inserted into a correspondingly designed holding bushing. This instance is shown in FIG. 3 where the bores 38 for the connecting bolts are arranged in a guide ring. In this case, the adjusting ring 8 is formed by the inner ring.

The bolts 30 that are screwed into the holding bushing extend through double holes 29 in the cover bushing 9 when attaching said cover bushing. In this case, the axial fastening by means of the bolts 30 can be realized by simply turning the cover bushing 9 relative to the adjusting ring 21. This bayonet connection arrangement allows a rapid processing of the servo valves.

FIG. 2 shows the arrangement of the double holes 29 in the cover bushing 9. The plunger 10 has the width 28 of a wrench at its upper end and can be connected to a standard press. FIGS. 2 and 3 also show details of the adjusting ring, with the adjusting ring initially being fixed in a nonrotatable fashion relative to the valve sleeve 5 by means of a clamping screw 31. It is practical to provide the adjusting ring with clamping cams 39 that, in the embodiment shown, extend like a secant and cooperate with the outer surface of the valve sleeve, namely with a correspondingly extending contour. A relative rotation between the valve sleeve 5 and the adjusting ring 8 is prevented by the clamping screw 31. A rotation of the adjusting ring 8 relative to the holding bushing 7 is realized by actuating the adjusting handle 32 that, in turn, actuates a lever 35 by means of which the adjusting ring is turned via a spindle 33 that is braced on a holding device 34. A ball joint 36 is arranged between the spindle 33 and the lever 37. The lever 35 is also provided with a joint 37. Consequently, the lever 35 can be moved over the range of adjustment 40 without any undesired forces becoming effective. The holding device 34 in the embodiment shown is fastened separately from the rotatable adjusting ring 8 by means of bolts.

List of reference numerals

1 Servo valve
2 Assembling device
3 Input shaft
4 Output shaft
5 Valve sleeve
6 Torque rod
7 Holding bushing
8 Adjusting ring
9 Cover bushing
10 Plunger
11 Hydraulic hole on the left side
12 Hydraulic hole on the right side
13 Hydraulic hole serving as a feed connection
14 Hydraulic hole serving as a return line
15 Axial limit stop
16 Radial shaft seal
17 Groove
18 Ring
19 O-ring
20 Clamping region
21 O-ring
22 Ring
23 Groove
24 Radial shaft seal
25 Guide region
26 Overlapping
27 Fastening
28 Width of a wrench
29 Double hole
30 Bolt
31 Clamping screw
32 Adjusting handle
33 Spindle
34 Holding device
35 Lever
36 Ball joint
37 Joint
38 Hole
39 Clamping cam
40 Adjusting range

I claim:

1. Device for assembling a servo valve comprising an output shaft, an input shaft, a torque rod connected to the input and output shafts, and a valve sleeve, said device comprising:

a) means for clamping the valve sleeve in a position in which the valve sleeve is fixed in the axial direction and rotatable about its axis, said clamping means including a holding bushing (7) for accommodating the valve sleeve (5) and an adjusting ring (8) that is placed on the holding bushing (7) and serves to turn the valve sleeve (5);

b) means for supporting a preassembled unit of the output shaft, the torque rod, and the input shaft axially in the valve sleeve so that the valve sleeve and the output shaft adjoin one another and can rotate relative to one another, said supporting means including a cover bushing (9) that is placed on the adjusting ring (8) and serves to guide the output shaft (4);

c) means for charging the valve sleeve with hydraulic pressure;

d) means for centering the valve sleeve by turning the valve sleeve relative to the input shaft; and e) means for pressing the output shaft axially further into the valve sleeve to fixedly connect, after centering of the valve sleeve, the output shaft and the valve sleeve together, said pressing means including a plunger (10) that cannot be turned relative to the cover bushing (9), but is placed on the cover bushing such that it can be moved in the axial direction and is connected with the output shaft (4).

2. Device according to claim 1, characterized by the fact that the holding bushing (7) is provided with a hole for accommodating the input shaft (3).

3. Device according to claim 2, characterized by the fact that the holding bushing (7) is provided with a radial shaft seal (16).

4. Device according to claim 1, characterized by the fact that the charging means includes hydraulic holes (11, 12, 13, 14) provided in the holding bushing.

5. Device according to claim 1, characterized by the fact that the adjusting ring (8) is provided with at least one clamping cam (39) for producing a rigid rotary connection with the valve sleeve (5).

6. Device according to claim 5, characterized by the fact that the at least one clamping cam (39) is realized in the shape of a secant.

7. Device according to claim 1, characterized by the fact that the adjusting ring (8) is provided with a clamping screw (31).

8. Device according to claim 1, characterized by the fact that the adjusting ring is arranged such that it can be turned relative to an annular sleeve.

9. Device according to claim 1, characterized by the fact that said centering means includes a spindle (33) provided for turning the adjusting ring (8).

10. Device according to claim 9, characterized by the fact that the spindle is connected with a lever (35) via a ball joint (36).

11. Device according to claim 1, characterized by the fact that an O-ring seal (19) is arranged between the adjusting ring (8) and the holding bushing (7).

12. Device according to claim 1, characterized by the fact that the cover bushing (9) is provided with a hole for accommodating the output shaft (4).

13. Device according to claim 1, characterized by the fact that an O-ring seal (21) is arranged between the cover bushing (9) and the adjusting ring (8).

14. Device according to claim 1, characterized by the fact that the cover bushing (9) is provided with a radial shaft seal (24).

15. Device according to claim 1, characterized by the fact that a feather key is arranged between the plunger (10) and the cover bushing (9) in order to produce a rigid rotary connection between the plunger and cover bushing.

* * * * *